United States Patent [19]

McGraw

[11] 4,038,651

[45] July 26, 1977

[54] MINIATURE DIGITAL COMMUNICATOR CAPABLE OF DISPLAYING A SERIES OF ALPHA-NUMERIC CHARACTERS

[76] Inventor: Thomas F. McGraw, 7538 Axton St., Springfield, Va. 22151

[21] Appl. No.: 594,425

[22] Filed: July 9, 1975

[51] Int. Cl.[2] .................................................. G06F 3/14

[52] U.S. Cl. ..................................... 340/336; 340/311; 340/324 R

[58] Field of Search .......... 340/311, 337, 336, 324 M, 340/365 R, 324 R

[56] References Cited

U.S. PATENT DOCUMENTS 3,846,783 11/1974 Apsell et al. ......................... 340/311

OTHER PUBLICATIONS

An A/N Display as a Communication Aid for the Dumb, Newell et al.; Med. & Biol. Eng., Jan. 1975, pp. 84–88.

*Primary Examiner*—Marshall M. Curtis

*Attorney, Agent, or Firm*—Joseph E. Rusz; Jacob N. Erlich

[57] ABSTRACT

The miniature digital communicator is a compact communications device intended for use where conditions are noisy, where no noise at all is permitted or where privacy is desired. It is a portable device with a series of alpha-numeric display elements. Radio-transmitted, digitally formatted data is displayed on the miniature digital communicator in the form of alpha-numeric characters which march or ripple across the display from right to left at an advancing rate of two characters per second. The entire package is small enough to be carried on the person, perhaps in a pocket, like the smallest electronic calculator.

17 Claims, 5 Drawing Figures

MINIATURE DIGITAL COMMUNICATOR CAPABLE OF DISPLAYING A SERIES OF ALPHA-NUMERIC CHARACTERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of communication, and, more particularly to a compact communications device which is capable of receiving digitally formatted matter and transmitting this information, in the form of alpha-numeric characters, across a display.

There is always a need for current, accurate communications. Heretofore, communications systems have been in the form of radios, telephones, television and ticker tape devices and the like, all of which being either sound transmitting, large in size of expensive to produce. In many environments, especially the noisy environment of work or transportation, the utilization of such audio devices severely compromises the communications ability of individuals. In addition, many areas must be kept quiet, that is, quiet to the point where a radio loud enough to be understood may violate the efficiency of other persons. In some areas, for example, such as buses, distracting radios have been even banned due to their possible effects on the driver. Finally, many forms of communications available today are of practically no use to the deaf or hard of hearing. Heretofore, solutions to these problems have resulted in the formation of expensive and/or cumbersome communications equipment such as televisions which cannot be utilized for personal needs and in specific areas with a minimal of expense.

SUMMARY OF THE INVENTION

The instant invention overcomes the problems set forth hereinabove by providing a portable electronic device for personal communication with a central transmitter. Instead of using sound for the man-machine interface, visual display is presented. Sound, however, may be provided as an adjunct to the receiver element if desired. The primary display of this invention is a series of alpha-numeric characters which march across the face of the miniature digital communicator much in the manner of a stock ticker. The exclusive use of integrated circuits permits low cost electronic display, while still permitting small size and low power drain.

The miniature digital communicator of this invention provides an accurate and clear digital operation. The basic on-off, yes-no digital format is inherently resistant to distortion and garbling especially in comparison with analog commercial radio of today. This digital communicator can be applied against a number of communications problems in civil, commercial, military, and personal activities. For example, a semi-secure communication link with the police field units is possible with this invention. Only the officer using the communicator of the instant invention would be able to see the display. In commerce, the miniature digital communicator could be used for such familiar communications as stock tickers, but with no noise and substantially less energy consumed. Military uses are virtually unlimited since anywhere a positive, reliable communication is required, the instant invention may have application. Furthermore, by the utilization of a privacy circuit, access to most unauthorized listeners would be denied.

Personal use of this invention would be unlimited since it would be available to communications such as news, weather, sports releases, etc. as well as being capable of communicating with the deaf or hard of hearing. To further enhance this application, the digital communicator of this invention can be fitted with an acoustic pickup, so that telephone lines can be used for the transmission media. With a similarly designed transmitter, and a compatible data rate, two way long distance communications could be established without a sound.

At a predetermined time each day, the transmitting station (where privacy is desired) would enter a predetermined code into the privacy circuits of their transmitters and the receivers would be set to match. Commercial subscribers for specialized communications would certainly retain the privacy capability, as would the military, and perhaps the diplomatic corps. In the military applications, the codes could be changed for every transmission if necessary, the messages kept as short as possible to enhance the protection offered by the privacy circuit.

The origin of the signals for the communicator of this invention is through a conventional alpha-numeric keyboard which forms no part of this invention, wherein each key is given a binary identity. For example, A would be termed a binary one and B binary two. For military applications, a direct link to the transmitter might be adequate for one-of-a-kind messages, but for general applications the keyboard would feed a recording mechanism, so that a long stream of data would be repeatedly cycled through the broadcast. As the news updates are necessary, they would be typed into a recorder upstream so that the oldest previous item is replaced first, but without interruption of the transmission. Transmission frequency is not critical, except for range (distance) requirements or special applications, with the data rate for this invention being low enough to be compatible with the lowest standard broadcast frequencies. In fixed installations, however, it is possible that high-speed bursts might be transmitted, requiring recording at the receiver to slow it down for display. This might be done to enhance the privacy aspect of the invention. Further, the signal could be rebroadcast within areas not penetrated by radio energy — metal buildings, buses, underground locations, etc.

The miniature digital communicator also has significant potential as a telephone terminal. In this application, its range could be extended to continental and international distances. The digital rate would have to be held down to be compatible with those of the phone system, but with a half second per character display, this should pose no problem. In a humanitarian sense, this may be one of the most important capabilities, since it would permit voice and hearing-handicapped persons to communicate via the telephone. For this reason, an acoustic pickup and preamplifier are included in the design of this invention.

It is therefore an object of this invention to provide a digital communicator which is extremely small in size and ideally suited for personal communication.

It is another object of this invention to provide a miniature digital communicator which permits positive communications in areas which are extremely noisy and areas wherein sound must be kept to a minimum.

It is a further object of this invention to provide a miniature digital communicator which can be easily adapted to receive telephone communications and therefore provide great assistance to the deaf of hard of hearing.

It is still a further object of this invention to provide a miniature digital commumicator which is economical to produce, highly reliable in operation and which utilizes conventional, currently available components that lend themselves to standard mass producing manufacturing techniques.

For a better understanding of the present invention together with other and further objects thereof reference in made to the following description taken in conjunction with the accompanying drawing and its scope will be pointed out in the appended claims.

Figure 1:
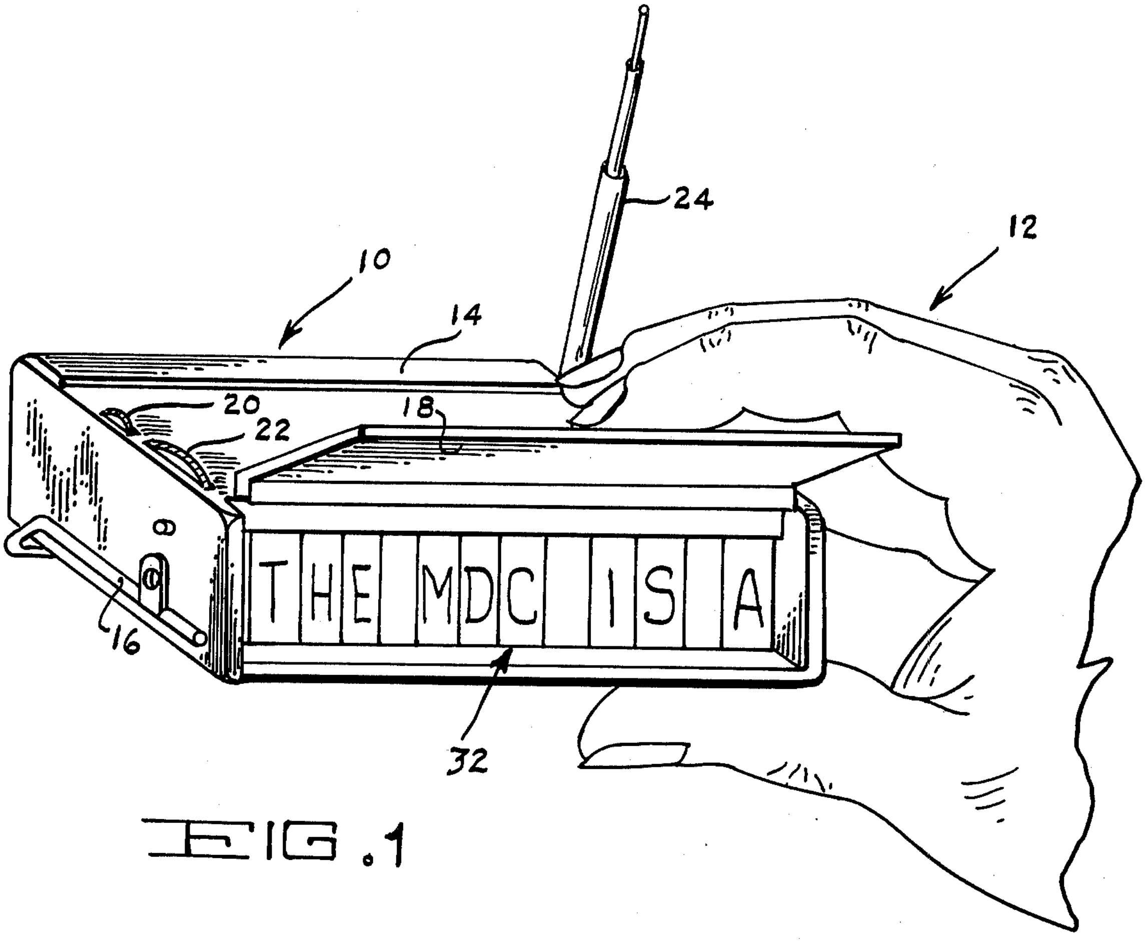
FIG. 1 is a pictorial representation of the miniature digital communicator of this invention shown in the hand of a user.
Figure 2:
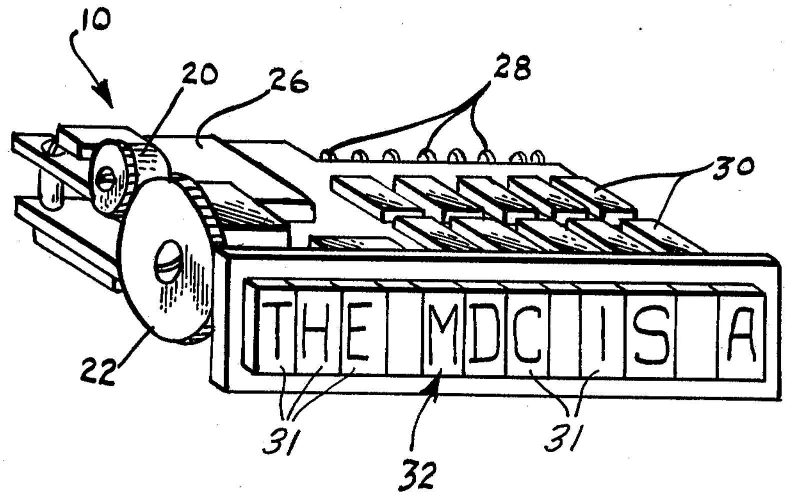
FIG. 2 is a pictorial representation of the miniature digital communicator of this invention shown with the cover removed therefrom.

Reference is now made to FIGS. 1 and 2 of the drawing which show in pictorial fashion the miniature digital communicator 10 of this invention.

FIG. 1 is an illustrative example of the relative size of communicator 10 with respect to the size of the hand 12 of a person using this device. As seen from this Figure communicator 10 is of a relatively small overall dimension and can be easily held. Communicator 10 is contained within an exterior housing or cover 14 made of any suitable material such as hard plastic which contains attached thereto a retractable standary 16 pivotally mounted on cover 14, and a movable lid or sun shade 18 which can be used to enclose the display unit when not in use or, as shown in FIG. 1, be used to shield the display from the rays of the sun when this invention is utilized in daylight. Also operatively mounted within and protruding from cover 14 are an on/off switch 20, a channel selector 22, and an antenna 24, all of which being operatively connected to the circuitry of communicator 10 of this invention.

FIG. 2 is a pictorial representation of the body 25 or interior of miniature digital communicator 10 with cover 14 removed. In this Figure, clearly evident are the power source or battery 26, on/off switch 20, channel selector 22, privacy switches 28, integrated circuits 30 and the twelve light emitting diode (LED) or liquid crystal (LC) elements 31 of display 32. All elements shown in pictorial fashion in FIG. 2 of the drawing are discussed and explained in detail hereinbelow with reference to FIGS. 3*a*, 3*b* and FIG. 4.

Still referring to FIG. 1 of the drawing, the signals intended for display by the miniature digital communicator 10 of this invention will have a similar format. The burst for any characters to be shown on display 32 will have a length of 9 bits in terms of timing. The burst begins with a timing pulse, which sets up the initial logic, signalling that a letter or numeral is about to be received in a manner described hereinbelow. This timing pulse is following by a blank period equal in time to two pulses. The blank is to facilitate the timing and synchronizing necessary to reset the logic between the characters. This two-space blank is never used for anything else.

The next six bits (or spaces) are used to identify the character to be displayed. Such a six bit code is capable of 63 combinations and can therefore illustrate all the letters of the alphabet (capitals only), all ten numerals and a broad selection of punctuation marks and special symbols. The time necessary for the nine bits is intentionally very short when compared to the half-second display period. This differential is significant in that it is the key to synchronization of the instant invention. Thus, no matter at what instant the communicator 10 is turned on it will be ready for a meaningful display within one-half second.

Figure 3A:
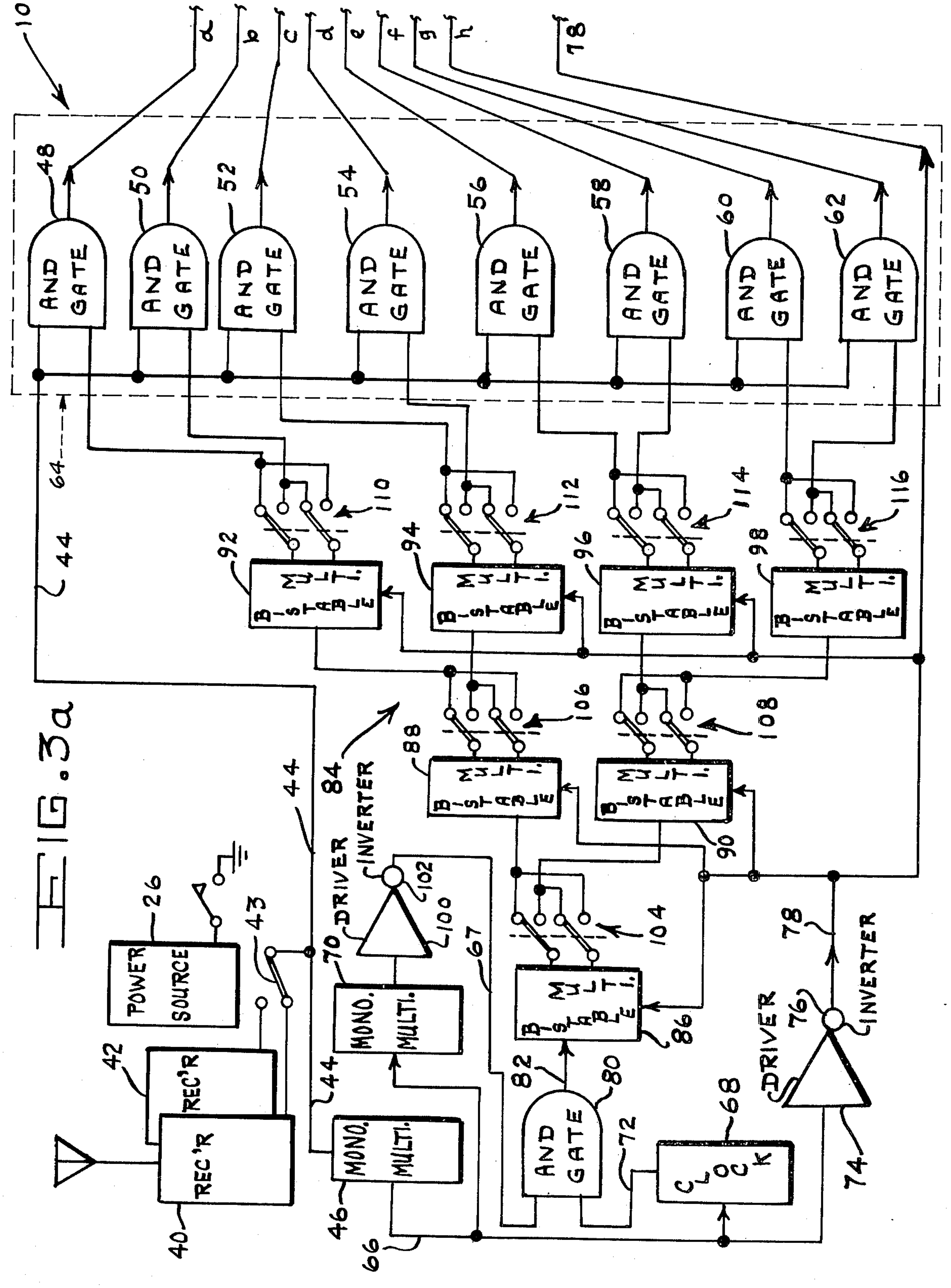
FIGS. 3*a* and 3*b* are schematic representations of the circuitry of the miniature digital communicator of this invention.
Figure 3B:
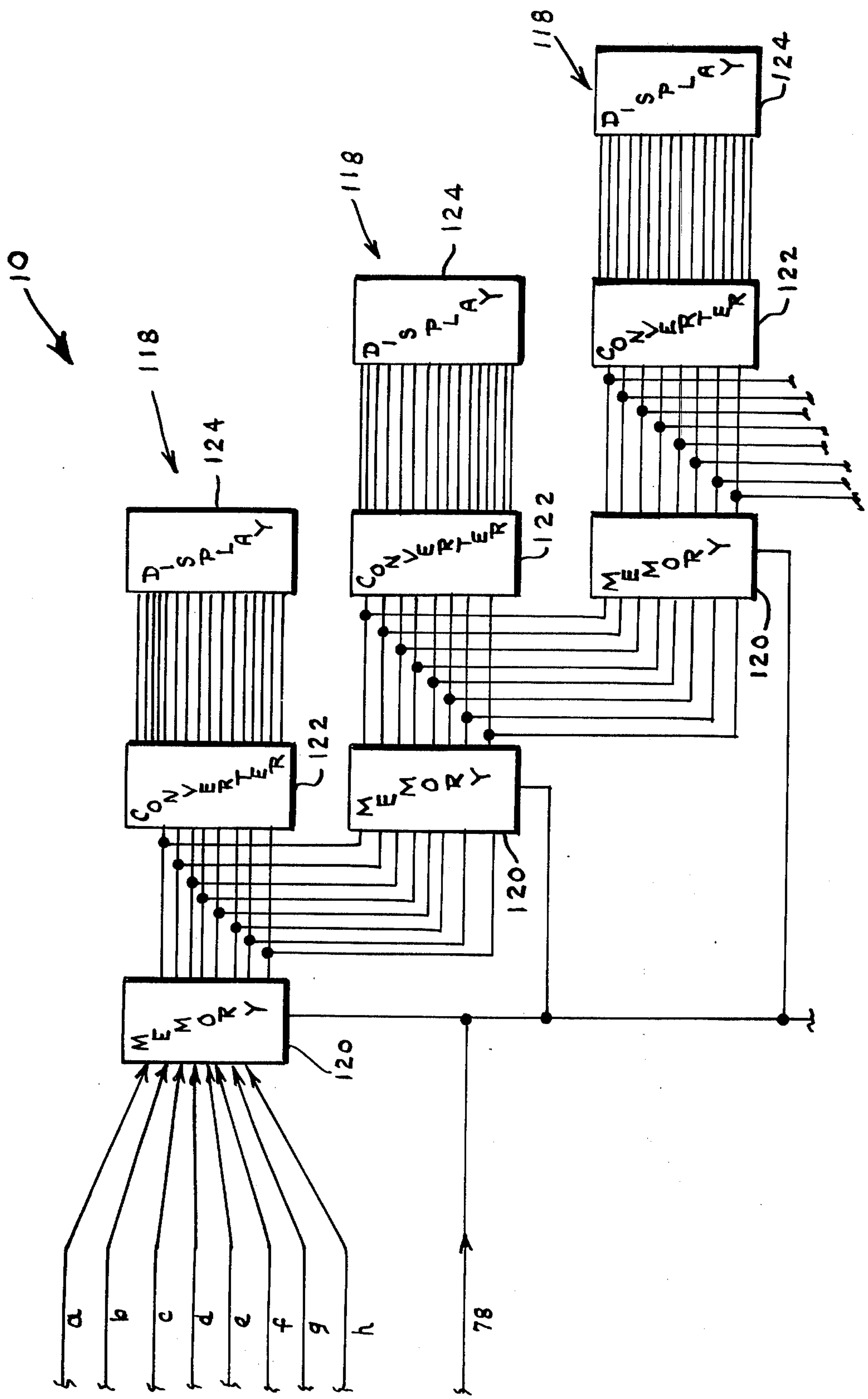

Reference is now made to the circuit diagram shown in FIGS. 3*a* and 3*b* of the drawing. The origin of the signals utilized by the communicator 10 of the instant invention which does not form part of this invention is a standard, conventional alpha-numeric keybroad. Each key is given a binary identity. For example, A might be termed binary one and B binary two. All digital information is received by communicator 10 by a conventional radio receiver circuit 40 or acoustic pickup 42 or the like. Power for the communicator 10 is furnished by any conventional power source such as battery 26. Although power source 26 is shown in FIG. 3*a*, it is not shown diagramatically attached to the various elements of this invention since the addition of numerous lines to each element would tend to obstruct the clarity of the wiring of the novel and essential elements of this invention.

The invention accepted by radio receiver 40 or acoustic pickup 42 is passed on as an information signal 44 through switch 43 upon the selection of the appropriate channel by channel selector 22. Information signal 44 proceeds to two other circuit elements; (1) a monostable multivibrator 46 and (2) one side each of eight two-input AND Gates 48, 50, 52, 54, 56, 58, 60 and 62 of a privacy circuit 64. The output 66 of multivibrator 46 enables a clock 68 (after a one bit delay by a monostable multivibrator 70) to oscillate for the period of one display (just under one-half second). Clock 68, which may be in the form of a variety of digital clock concepts, ranges from a simple unijunction transistor circuit to a more likely integrated circuit such as an astable multivibrator. Clock 68, thus enabled, produces a stream of accurate, timed pulses 72 at a gate equal to the transmitted data rate and at a width to accommodate a partial overlap in time with transmitted date bits.

Monostable multivibrator 46 also provides its output 66 to a buffer (driver) 74 in the form of a circuit element providing isolation and amplification combined with an inverter 76, a conventional circuit element usually associated with a driver which reverses the polarity of a signal. Driver 74 is thus timed, with its resultant narrow positive output 78 serving the rest of the circuits with a reset pulse, which is generally intended to make those circuits receptive to the next signal in a manner to be described hereinbelow.

Output 72 of clock 68 now appears as a stream of identical pulses interrupted approximately every one-half second when monostable multivibrator 46 drops out in anticipation of the next character. Signal 72 may be seen at the output of AND gate 80 as signal 82.

A multiplexer circuit 84 correlates clock signal 82 directly with the output 44 of receiver 40. Multiplexer circuit 84 is made up of bistable multivibrators 86, 88, 90, 92, 94, 96 and 98 plus privacy circuit 64 made of eight AND Gates 48, 50, 52, 54, 56, 58, 60 and 62. At AND Gate 80, which is located before multiplexer circuit 84, the clock output 72 is held up for the length of one bit until monostable multivibrator 70 fires. Multivibrator 70 and a driver 100 and an inverter 102 associated therewith are than activated for that period from the same output 66 from multivibrator 46 that enables clock 68. This delay prevents multiplexer circuit 84 from being activated by pulse 44. The multiplexer bistable multivibrators 86, 88, 90, 92, 94, 96 and 98 are cascaded so that the output of bistable multivibrator 86 can pass a signal to either bistable multivibrator 88 or multivibrator 90, depending on the position of a conventional privacy switch 104. As each bistable multivibrator 86, 88, 90, 92, 94, 96 and 98 is fired, it flips and in turn fires the next multivibrator as determined by the position of the respective privacy switches 104, 106, 108, 110, 112, 114, and 116 as shown in FIG. 2 as elements 28. These switches being in the form of any conventional double pole, double throw switch.

As any single pulse 66 passes through clock 68, bistable multivibrator 86, 88, 90, 92, 94, 96 and 98 and switches 104, 106, 108, 110, 112, 114 and 116, its presence is shortly acknowledged at one of the And Gates 48, 50, 52, 54, 56, 58, 60 or 62 which form the privacy circuit 64 or output of the multiplexer circuit 84. For any combination of the privacy switches, there will be a single path through the multiplexer circuit 84 for a particular clock bit. When the second clock bit is sensed, bistable multivibrators 86, 88, 90, 92, 94, 96 and 98 are routed to that path predetermined for the second bit. This sequence is followed through a period time equal to a six bit character, which is sufficient to identify a character. No actual transmitted data is handled in either clock 68 or multiplexer circuit 84. These two circuits merely combine to assign addresses for each of the data bits received. Data bit are assigned their correct addresses by correlation in the AND Gate 48, 50, 52, 54, 56, 58, 60 and 62 of privacy circuit 64. The received data stream is supplied to all the AND Gates, but only those enabled by a clock bit will pass a signal to a display group 118 (three of which are shown in FIG. 3b). The total of display group 118 corrresponds in number, 12 to the twelve element display 32 in FIG. 1 and 2. Although 12 such elements are preferred, any other desirable number can become part of this invention. If privacy switches 104, 106, 108, 110, 112, 114 and 116 are not in use, or all are in the same normal position as shown in the drawing, the sequence seen by privacy circuit 64 or AND Gates 48, 50, 52, 54, 56, 58, 60 and 62 would be in the following order: AND Gate 48, AND Gate 56, AND Gate 52, AND Gate 60, AND Gate 50, AND Gate 58, AND Gate 54, and AND Gate 62. Use of any or all privacy switches will alter at least some of these addresses.

Figure 4:
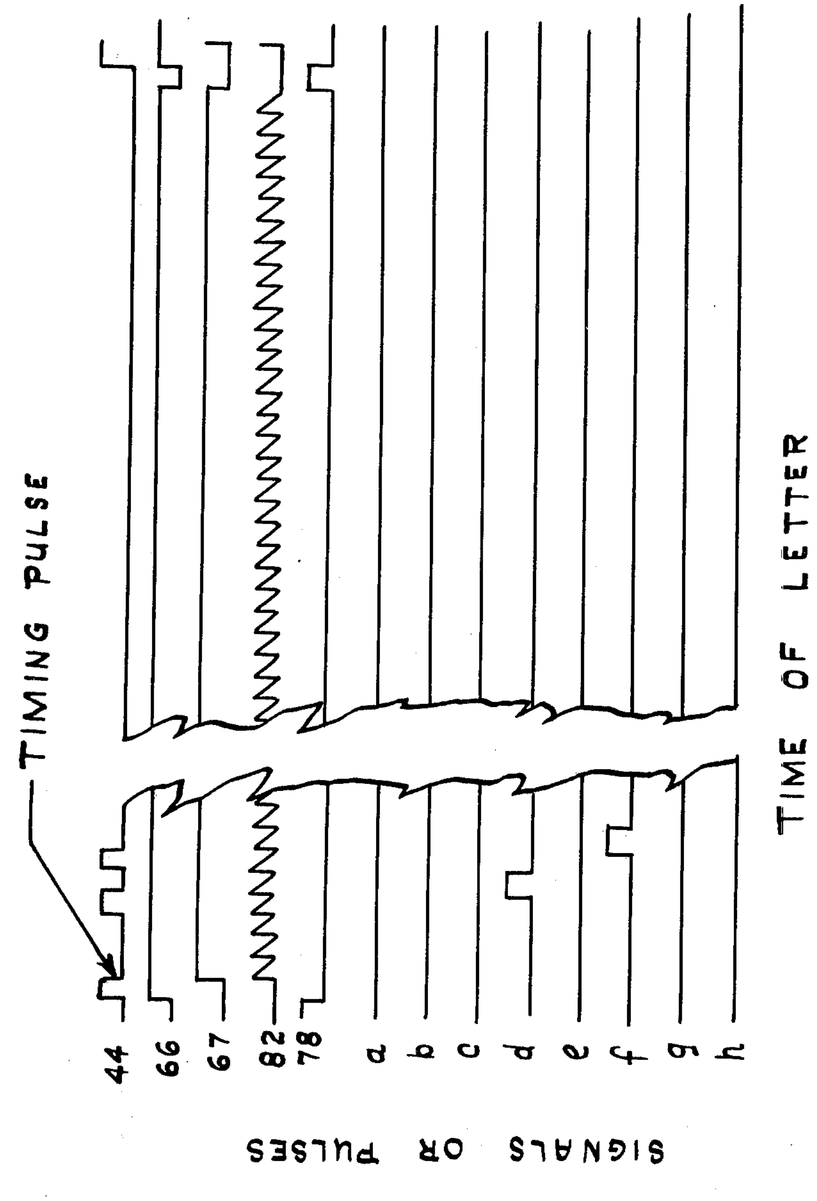
FIG. 4 is a graphic representation of the pulses as transmitted through various points in the circuitry of the miniature digital communicator of this invention.

The transmitted addressed date, a, b, c, d, e, f, g and h go directly from AND Gates 48, 50, 52, 54, 56, 58, 60 and 62, respectively, through a corresponding conventional memory such as a bistable latch 120 and any suitable converter such as a conventional binary coded decimal 122 to a conventional display 124 made of a light emitting diode (LED) or liquid crystal (LC) display, of each display group 118. After the bistable latch 120 in a particular display group 118 has captured the data, and at the end of that particular display, a pulse 78 from buffer or driver 74 resets the bistable multivibrators 48, 50, 52, 54, 56, 58, 60 and 62 to their baseline condition, in which they await the next clock burst. If desirable conventional displays are available which internally include the latch 120 and coded decimal 122. One bistable latch 120 is necessary for each of the display characters in order to hold it for its one-half second. The key to having the display characters ripple across the display 32 lies in the bistable latch 120 for each display group 118. Bistable latch 120 awaits correspondence of the energized elements from the previous display and the coding system reset pulse. With these inputs bistable latch 120 conducts the previous display. This signal is then latched to the next display group 118, and held until the next reset pulse 78 causes the transfer to the passed on down the line. For clarification reference is made to FIG. 4 of the drawing which shows the relationship between various signals in the circuit of this invention with respect to the time it takes to produce a letter. FIG. 4 would therefore be an illustrative example of letter T.

Although this invention has been described with reference to a particular embodiment, it will be understood to those skilled in the art that this invention is also capable of a variety of further embodiments within the spirit and scope of the appended claims.

I claim:

1. A miniature digital communicator capable or receiving digital information in the form of a binary format and displaying said information in the form of alpha-numeric characters rippling across a display comprising means for receiving said digital, binary information, said receiving means emitting a series of information pulses which describe an alpha-numeric character, means operably connected to said receiving means for accepting said information pulses and producing an enabling signal for said communicator, means operably connected to said enabling means for producing a series of timed pulses, means operably connected to said enabling means for producing a reset pulse, means operably connected to said receiving means, said enabling means and said timing means for accepting said information pulses and correlating said timed pulses with the arrival of said information pulses, said correlating means producing a sequential series of pulses, a memory means operatively connected to said correlating means for accumulating said sequential series of pulses, means operatively connected to said memory means for conventing said binary, digital information to alphanumeric information upon said memory means receiving said reset pulse, means for displaying said alphanumeric information operatively connected to said converting means and means operatively associated with said communicator for supplying power to said communicator.

2. A miniature digital communicator as defined in claim 1 wherein said enabling means comprises a first multivibrator operatively connected to said receiving means, a second multivibrator operatively connected to said first multivibrator, means for providing isolation and amplification to a signal from said second multivibrator operably connected thereto, means for reversing the polarity of a signal from said isolating and amplifying means operatively connected thereto, and an AND gate operatively connected to said polarity reversing means.

3. A miniature digital communicator as defined in claim 2 wherein said timing means comprises an astable multivibrator operatively connected to said AND gate and said first multivibrator.

4. A miniature digital communicator as defined in claim 3 wherein said first and second multivibrators are monostable multivibrators.

5. A miniature digital communicator as defined in claim 4 wherein said means for producing a reset pulse is operably connected to said first multivibrator and comprises a means for providing isolation and amplification and means for reversing the polarity of a signal from said first multivibrator.

6. A miniature digital communicator as defined in claim 1 wherein said correlating means comprises a multiplexer circuit.

7. A miniature digital communicator as defined in claim 6 wherein said multiplexer circuit comprises a plurality of bistable multivibrators and a privacy circuit operatively connected thereto.

8. A miniature digital communicator as defined in claim 7 wherein said privacy circuit comprises a plurality of AND gates.

9. A miniature digital communicator as defined in claim 8 wherein said bistable multivibrators are connected in cascaded fashion, and switches are operatively connected between said plurality of bistable multivibrators and between said bistable multivibrators and said AND gates of said privacy circuit.

10. A miniature digital communicator as defined in claim 9 wherein said enabling means comprises a first multivibrator operatively connected to said receiving means, a second multivibrator operatively connected to said first multivibrator, means for providing isolation and amplification to a signal from said second multivibrator operably connected thereto, means for reversing the polarity of a signal from said isolating and amplifying means operatively connected thereto, and an AND gate operatively connected to said polarity reversing means.

11. A miniature digital communicator as defined in claim 10 wherein said timing means comprises an astable multivibrator operatively connected to said AND gate and said first multivibrator.

12. A miniature digital communicator as defined in claim 11 wherein said first and second multivibrators are monostable multivibrators.

13. A miniature digital communicator as defined in claim 12 wherein said means for producing a reset pulse is operably connected to said first multivibrator and comprises a means for providing isolation and amplification and means for reversing the polarity of a signal from said first multivibrator.

14. A miniature digital communicator as defined in claim 13 wherein said memory means comprises a plurality of bistable latches.

15. A miniature digital communicator as defined in claim 14 wherein said converting means comprises a plurality of binary coded decimals.

16. A miniature digital communicator as defined in claim 15 wherein said display means comprises a plurality of light emitting diodes.

17. A miniature digital communicator as defined in claim 15 wherein said display means comprises a plurality of liquid crystals.

* * * * *

UNITED STATES PATENT OFFICE
CERTIFICATE OF CORRECTION

PATENT NO. 4,038,651
DATED 26 July 1977
INVENTOR(S) : Thomas F. McGraw

It is certified that error appears in the above-identified patent and that said Letters Patent are hereby corrected as shown below:

Column 1, line 22, "of" should read --or--

Column 3, line 41, "standary" should read ---standard---

Claim 1, line 22 "conventing" should read ---converting---

Signed and Sealed this

*Tenth* Day of *January 1978*

[SEAL]

*Attest:*

RUTH C. MASON
*Attesting Officer*

LUTRELLE F. PARKER
*Acting Commissioner of Patents and Trademarks*